United States Patent
Inoue et al.

(10) Patent No.: US 11,945,059 B2
(45) Date of Patent: Apr. 2, 2024

(54) ROBOT

(71) Applicant: FANUC CORPORATION, Yamanashi (JP)

(72) Inventors: Toshihiko Inoue, Yamanashi (JP); Tomoyuki Motokado, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 1193 days.

(21) Appl. No.: 16/508,566

(22) Filed: Jul. 11, 2019

(65) Prior Publication Data

US 2020/0038985 A1 Feb. 6, 2020

(30) Foreign Application Priority Data

Jul. 31, 2018 (JP) .................................. 2018-143893

(51) Int. Cl.
 *B23K 9/133* (2006.01)
 *B25J 9/00* (2006.01)
 *B25J 11/00* (2006.01)

(52) U.S. Cl.
 CPC ............ *B23K 9/133* (2013.01); *B25J 9/0009* (2013.01); *B25J 11/005* (2013.01)

(58) Field of Classification Search
 CPC ........ B23K 9/133; B23K 37/02; B23K 37/00; B25J 9/0009; B25J 11/005; B25J 19/0029; B25J 13/00
 See application file for complete search history.

(56) References Cited

U.S. PATENT DOCUMENTS

| 4,547,120 A | 10/1985 | Turner, Jr. et al. |
| 5,065,062 A | 11/1991 | Uehara et al. |
| 2004/0261563 A1* | 12/2004 | Inoue ................... B25J 19/0025 74/490.03 |
| 2007/0017911 A1 | 1/2007 | Mishima et al. |

(Continued)

FOREIGN PATENT DOCUMENTS

| CN | 107020452 A | 8/2017 |
| CN | 107160010 A | 9/2017 |

(Continued)

OTHER PUBLICATIONS

Japanese Office Action dated Aug. 11, 2020, in connection with corresponding JP Application No. 2018-143893 (9 pp., including machine-generated English translation).

(Continued)

*Primary Examiner* — Basil T. Jos
(74) *Attorney, Agent, or Firm* — Maier & Maier, PLLC

(57) ABSTRACT

A robot is provided with a first base, a robot arm having a rotation arm member, and a second base. A bottom end portion of the first base is fixed to an upper end portion of the second base using a fixing member, the rotation arm member includes an arm member opening, the second base includes an upper surface having an upper opening and a side surface having a side opening, the rotation arm member and the first base are configured to allow the conduit containing the welding wire and introduced into an interior of the rotation arm member through the arm member opening to reach the upper opening, the side opening allows the conduit introduced into an interior of the second base through the upper opening to come out of the second base.

6 Claims, 3 Drawing Sheets

(56) References Cited

U.S. PATENT DOCUMENTS

| | | |
|---|---|---|
| 2010/0032420 A1 | 2/2010 | Inoue et al. |
| 2014/0137685 A1 | 5/2014 | Iwayama |
| 2016/0023360 A1 | 1/2016 | Saito et al. |
| 2017/0282382 A1 | 10/2017 | Inoue et al. |
| 2017/0291313 A1 | 10/2017 | Inoue et al. |

FOREIGN PATENT DOCUMENTS

| | | |
|---|---|---|
| CN | 107813078 A | 3/2018 |
| EP | 1 491 300 A1 | 12/2004 |
| EP | 2 977 152 A2 | 1/2016 |
| JP | 62137177 A | 6/1987 |
| JP | H03-136778 A | 6/1991 |
| JP | H07-246587 A | 9/1995 |
| JP | 08155881 A * | 6/1996 |
| JP | H08-155881 A | 6/1996 |
| JP | 3488899 B2 | 1/2004 |
| JP | 2005-014159 A | 1/2005 |
| JP | 2006-007256 A | 1/2006 |
| JP | 2010-036231 A | 2/2010 |
| JP | 2011-152591 A | 8/2011 |
| JP | 4741639 B2 | 8/2011 |
| JP | 2014-069270 A | 4/2014 |
| JP | 2014-100743 A | 6/2014 |
| JP | 2016-022575 A | 2/2016 |
| JP | 2017-185573 A | 10/2017 |
| JP | 2017-185597 A | 10/2017 |
| KR | 1020080030187 A | 4/2008 |

OTHER PUBLICATIONS

Japanese Search Report dated Jul. 22, 2020, in connection with corresponding JP Application No. 2018-143893 (17 pp., including machine-generated English translation).

* cited by examiner

ROBOT

CROSS-REFERENCE TO RELATED APPLICATIONS

This application is based on and claims priority to Japanese Patent Application No. 2018-143893 filed on Jul. 31, 2018, the content of which is incorporated herein by reference in its entirety.

FIELD

The present invention relates to a robot.

BACKGROUND

Conventionally, there is known a robot including: a base; and a robot arm having a rotation arm member supported by the base to be rotatable about a vertical axis line, wherein a conduit containing a welding wire is introduced into the rotation arm member from an upper side of the rotation arm member, and the introduced conduit is inserted through the rotation arm member and the base and pulled out from a side of the base (cf. Japanese Unexamined Patent Application, Publication No. 2011-152591).

SUMMARY

A robot according to one aspect of the present invention includes: a first base; a robot arm having a rotation arm member supported by the first base, the rotation arm being rotatable about a vertical axis line; and a second base, wherein a bottom end portion of the first base is fixed to an upper end portion of the second base using a fixing member, the rotation arm member includes an arm member opening for introducing a conduit into an interior of the rotation arm member, the second base includes an upper surface having an upper opening and a side surface having a side opening, the rotation arm member and the first base include a hollow portion which allows the conduit introduced into the interior of the rotation arm member through the arm member opening to reach the upper opening, the side opening allows the conduit introduced into an interior of the second base through the upper opening to come out of the second base, and the conduit is configured to contain a welding wire.

DETAILED DESCRIPTION

Hereinafter, a robot 1 according to one embodiment of the present invention will be described with reference to the drawings.

Figure 1:
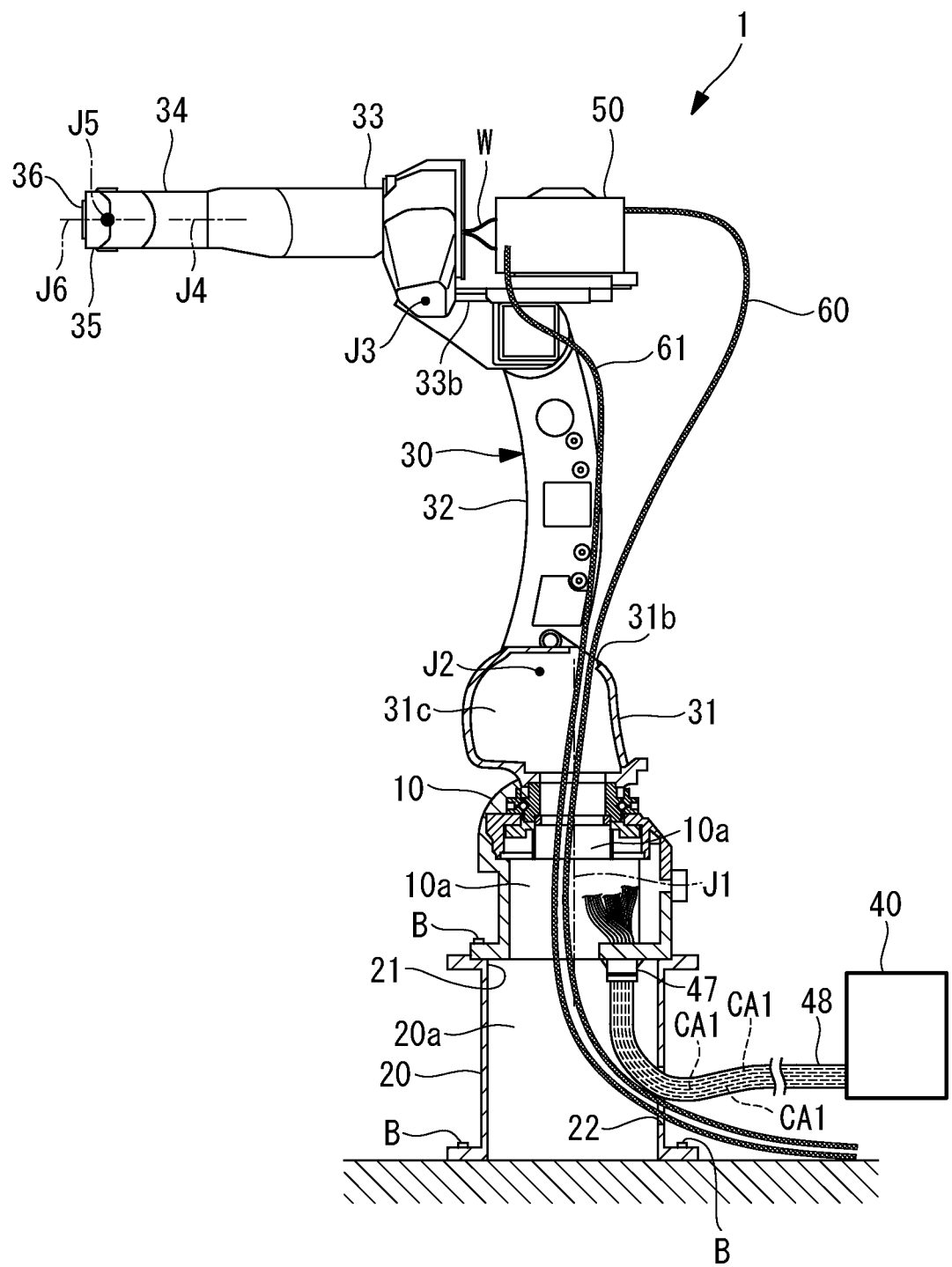
FIG. 1 is a partial cross-sectional side view of a robot according to one embodiment of the present invention.

As shown in FIG. 1, an example of the robot 1 according to this embodiment is a 6-axis articulated robot, including a first base 10 and a robot arm 30, where the robot arm 30 is controlled by a controller 40.

As an example, the robot arm 30 includes: a rotation arm member 31 supported by the first base 10 rotatable about a first axis (vertical axis line) J1 in the vertical direction; a first swing arm member 32 supported by the rotation arm member 31 so as to be swingable about a second axis (horizontal axis line) J2 in the horizontal direction; a second swing arm member 33 supported at a distal end portion of the first swing arm member 32 so as to be swingable about a third axis (horizontal axis line) J3 in the horizontal direction; a first distal-end-side arm member 34 supported at a distal end portion of the second swing arm member 33 rotatable about a fourth axis J4 extending along a longitudinal direction of the second swing arm member 33; a second distal-end-side arm member 35 supported at a distal end portion of the first distal-end-side arm member 34 so as to be swingable about a fifth axis J5 intersecting perpendicularly to the longitudinal direction of the second swing arm member 33; and a third distal-end-side arm member 36 supported by the second distal-end-side arm member 35 rotatable about a sixth axis J6 intersecting perpendicularly to a direction along which the fifth axis J5 extends.

Further, the first base 10 contains a servomotor 31a (FIG. 2) for driving the rotation arm member 31, and the robot arm 30 contains servomotors 32a, 33a, 34a, 35a, and 36a (FIG. 2) for respectively driving the first swing arm member 32, the second swing arm member 33, the first distal-end-side arm member 34, the second distal-end-side arm member 35, and the third distal-end-side arm member 36.

Figure 2:
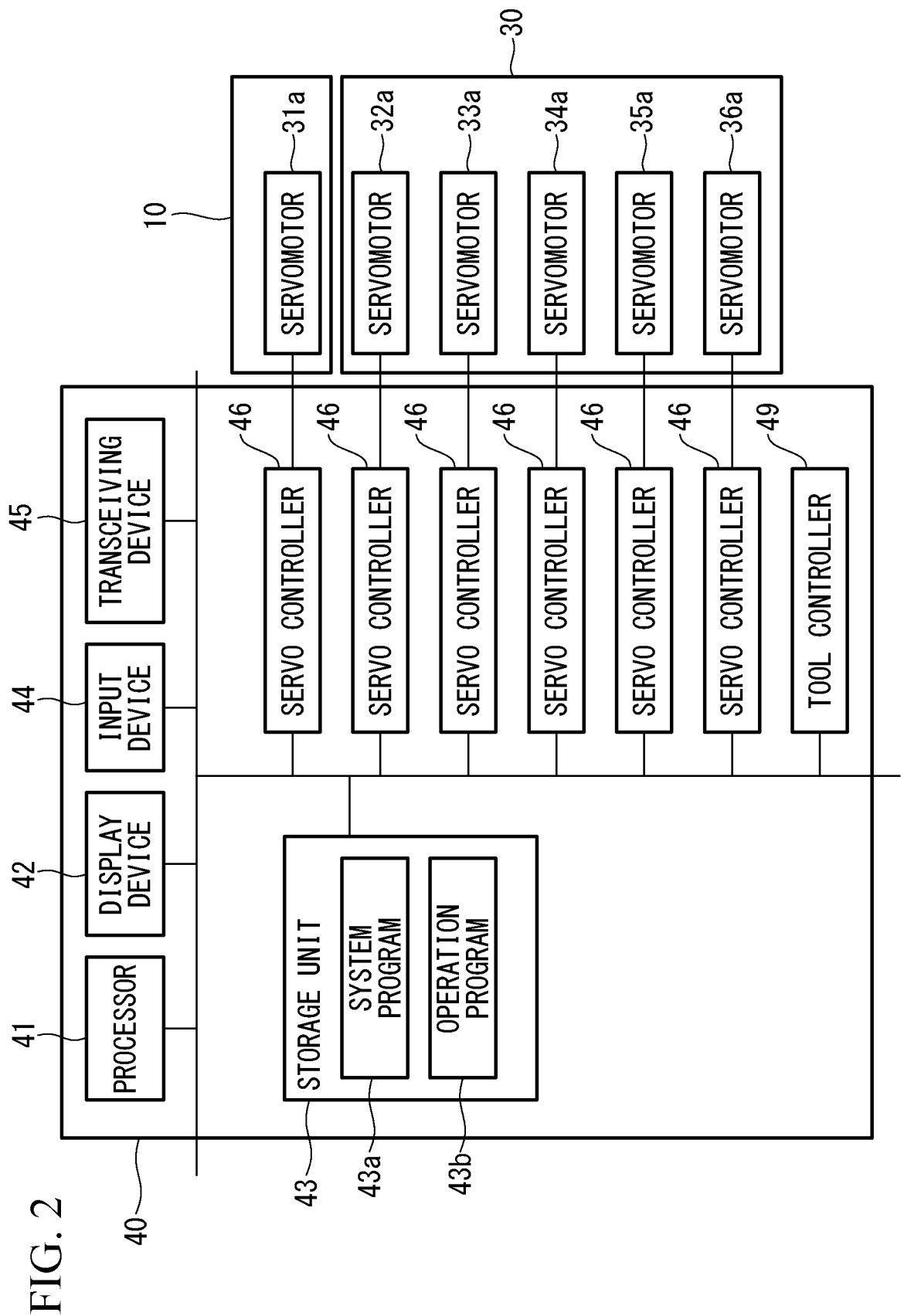
FIG. 2 is a block diagram of a controller of the robot according to this embodiment.

As shown in FIG. 2, the controller 40 includes: a processor 41 such as a CPU; a display device 42; a storage unit 43 having a non-volatile storage, a ROM, a RAM, or the like; an input device 44 such as a keyboard, a touch panel, or an operator's panel; a transceiving device 45 for receiving and transmitting signals; and servo controllers 46 connected respectively to the servomotors 31a, 32a, 33a, 34a, 35a, and 36a.

The storage unit 43 stores a system program 43a, which serves basic functions of the controller 40. The storage unit also stores an operation program 43b. Based on the operation program 43b, the processor 41 transmits control commands for controlling the servomotors 31a, 32a, 33a, 34a, 35a, and 36a to the respective servo controllers 46, and transmits a control command to a tool controller 49 for a welding tool such as a welding gun (not shown) provided for the third distal-end-side arm member 36. With this, the robot 1 performs a welding operation.

The robot 1 and the controller 40 are connected using a plurality of cables CA1 and CA2 in which a signal line, a power line, and the like are placed. In this embodiment, the controller 40 contains a power supply (not shown) for supplying electric power to the servomotors 31a, 32a, 33a, 34a, 35a, and 36a. However, the power supply may be provided separately from the controller 40.

Further, in this embodiment, one ends of the plurality of cables CA1 from the controller 40 are attached to a lower surface of the first base 10 by a connector 47, the plurality of cables CA2 are respectively connected to the cables CA1 within the first base 10, and the plurality of cables CA2 are respectively connected to the servomotors 31a, 32a, 33a, 34a, 35a, and 36a, and the like. For example, a part of the plurality of cables CA2 are connected to the servomotor 31a disposed within the first base 10. The plurality of cables CA1 are covered by a cable conduit 48. Here, the cables CA1 and the cables CA2 may be connected to each other without using the connector 47.

The robot 1 according to this embodiment includes a second base 20, and a bottom end portion of the first base 10 is fixed to an upper end portion of the second base 20 using a fixing member B such as a bolt. The second base 20 according to this embodiment is in a tubular shape extending vertically, and the second base 20 has an inner space (interior) 20a. The second base 20 is fixed, using a bolt B, to a predetermined fixation surface such as a floor. It is possible to provide the second base member 20 having height in a variety of range, as required.

The first base 10 according to this embodiment is in a bowl shape having a downward opening, and the first base 10 has an inner space (interior) 10a.

Here, the first base 10 and the second base 20 may be in different shapes as long as the inner spaces 10a and 20a as hollow spaces are provided.

The second base 20 has an upper opening 21 in its upper surface and a side opening 22 in its side surface. The inner space 20a of the second base 20 continues to the inner space 10a of the first base 10 via the upper opening 21.

On a side of an upper end of the rotation arm member 31, an arm member opening 31b is provided, and the arm member opening 31b continues to an inner space (interior) 31c in the rotation arm member 31. Further, the inner space 31c of the rotation arm member 31 continues to the inner space 10a of the first base 10, and the inner space 31c and the inner space 10a constitute a hollow portion located at a position including the first axis J1. Here, depending on a specification of the robot 1, one or both of the inner space 31c and the inner space 10a are not located at the position including the first axis J1.

On a side of a base end side of the second swing arm member 33, a wire feeding device 50 is attached via a supporting member 33b. The wire feeding device 50 is a device for gradually feeding a welding wire W toward the welding tool in the welding operation. The wire feeding device 50 has a known configuration as disclosed in Japanese Unexamined Patent Application Publication No. 2011-152591, including a pair of rollers for holding the welding wire W and a motor for driving the pair of rollers, for example, and the welding wire W is gradually fed toward the welding tool by the motor driving the rollers.

The welding wire W is supplied to the wire feeding device 50 using a conduit 60. As one example, one end of the conduit 60 is connected to the wire feeding device 50, and the other end of the conduit 60 is disposed near a supply source (not shown) of the welding wire W. One example of the supply source is a reel around which the welding wire W is wound. The welding wire W from the supply source is supplied into the conduit 60 through the other end of the conduit 60, and the welding wire W inserted through the conduit 60 is supplied to the wire feeding device 50.

Here, a portion of the conduit 60 between the one end and the other end of the conduit 60 is disposed within the inner space 31c of the rotation arm member 31, the inner space 10a of the first base 10, and the inner space 20a of the second base 20, via the arm member opening 31b and the side opening 22.

Further, to the wire feeding device 50, one end of a control cable conduit 61, within which signal lines, a power line, and the like connecting the wire feeding device 50 and a controller such as the controller 40 are disposed, is connected, and the other end of the control cable conduit 61 is disposed near the controller. A portion of the control cable conduit 61 between the one end and the other end of the control cable conduit 61 is disposed within the inner space 31c of the rotation arm member 31, the inner space 10a of the first base 10, and the inner space 20a of the second base 20, via the arm member opening 31b and the side opening 22.

Figure 3:
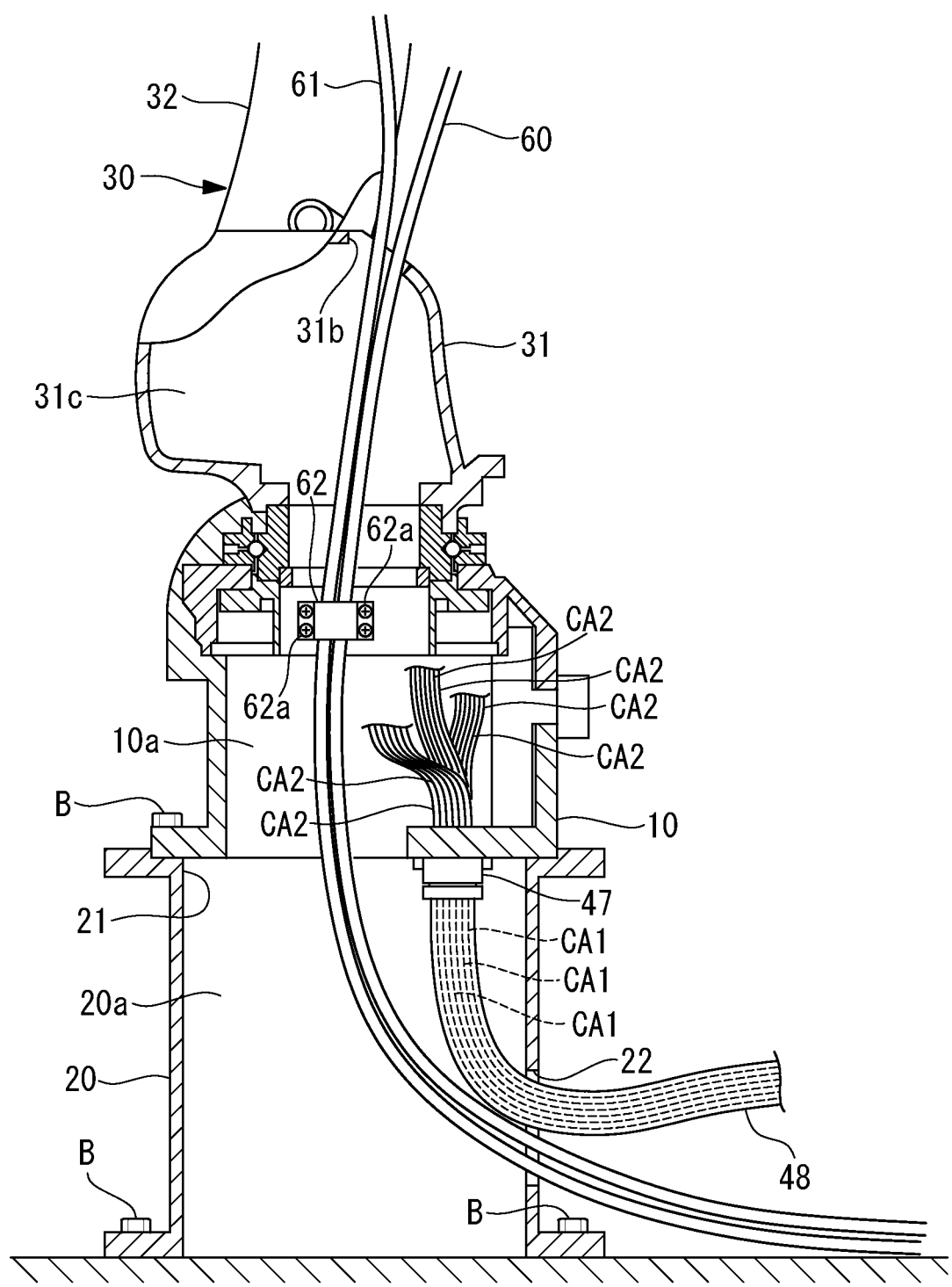
FIG. 3 is a partial cross-sectional side view of a main part of the robot according to this embodiment.

As shown in FIG. 3, the conduit 60 and the control cable conduit 61 disposed within the rotation arm member 31 and the first base 10 are attached to a portion of the first base 10 by an attachment member 62. The attachment member 62 is formed by press working to a plate-shaped member, and as the attachment member 62 is fixed to the first base 10 by a plurality of bolts 62a, the conduit 60 and the control cable conduit 61 are positioned between the attachment member 62 and the first base 10. With this, positioning of the conduit 60 and the control cable conduit 61 is performed. Here, the attachment member 62 may be the attachment member of a different type such as a banding band.

With this configuration, as the attachment member 62 may not move by rotation of the rotation arm member 31, movement and deformation of the conduit 60 and the control cable conduit 61 positioned below the attachment member 62 due to the rotation may be suppressed.

Here, the attachment member 62 may be attached to the rotation arm member 31. In this case, the attachment member 62 moves due to the rotation of the rotation arm member 31. In such a case in which a distance between the rotation arm member 31 and the wire feeding device 50 is short, the configuration of attaching the attachment member 62 to the rotation arm member 31 is beneficial in order to prevent deformation of the conduit 60 and the control cable conduit 61 between the rotation arm member 31 and the wire feeding device 50 as much as possible.

As described above, the robot according to this embodiment is provided with: the first base 10; the robot arm 30 having the rotation arm member 31 supported by the first base 10 rotatable about the first axis J1; and the second base 20, wherein the bottom end portion of the first base 10 is fixed to the upper end portion of the second base 20 using the fixing member B, the rotation arm member 31 includes the arm member opening 31b for introducing the conduit 60 into the interior of the rotation arm member 31, the second base 20 includes the upper surface having the upper opening 21 and the side surface having the side opening 22, the rotation arm member 31 and the first base 10 include a hollow portion which allows the conduit 60 introduced into the inner space 31c of the rotation arm member 31 through the arm member opening 31b to reach the upper opening 21, the side opening 22 allows the conduit 60 introduced into the inner space 20a of the second base 20 through the upper opening 21 to come out of the second base 20, and the conduit 60 is configured to contain the welding wire W.

With this configuration, the bottom end portion of the first base 10 is fixed to the upper end portion of the second base 20 using the fixing member B. Therefore, even when the first base 10 is a base for a versatile robot, the rotation arm member 31 may be located at a height of 1 m or higher by fixing the first base 10 to the upper end portion of the second base 20.

Here, the conduit 60 introduced into the rotation arm member 31 is pulled out through the side opening 22 defined in the second base 20, in place of the first base 10. Therefore, it is possible to suppress intrusion of dust into the first base 10, as compared to the case in which an opening for pulling the conduit 60 out is provided in the first base 10. As the motor 31a for the rotation arm member 31 and the like are disposed within the first base 10, it is desirable to prevent dust from entering the first base 10 as much as possible.

Further, the conduit 60 introduced into the rotation arm member 31 and inserted through the hollow portion of the rotation arm member 31 and the first base 10 is pulled out through the side opening 22 of the second base 20 disposed below the first base 10. Therefore, a curvature radius of the conduit 60 becomes greater, as compared to the case in which the conduit 60 introduced into the rotation arm member 31 is pulled out through the opening defined in the side surface of the first base 10, and it is possible to prevent the welding wire W within the conduit 60 from being bent.

The conduit 60 includes therein an inner wall formed by a steel wire coiled helically. Therefore, the conduit 60 may be curved. However, if a curvature radius of the conduit 60 becomes small, the welding wire W within the conduit 60 may be bent. In particular, the welding wire W can be easily bent when the welding wire W is an aluminum wire. When the bent welding wire W moves through the curved conduit 60, the inner wall of the conduit 60 is damaged by the bent portion of the welding wire W. This damaged portion in turn damages the welding wire W that is fed afterwards, and this leads to accumulation of such cutting powder produced within the conduit 60. This embodiment is advantageous in order to prevent or reduce accumulation of cutting powder.

It should be noted that while a middle portion of the conduit 60 is attached to the rotation arm member 31 or the first base 10 by the attachment member 62 in this embodiment, a portion of the conduit 60 that is lower than the attachment member 62 is attached neither to the first base 10 nor to the second base 20. Further, the side opening 22 is larger than an outer diameter of the conduit 60 and the control cable conduit 61. Therefore, the conduit 60 and the control cable conduit 61 are able to move within the side opening 22 in a direction perpendicular to their longitudinal direction. As the arm 30 performs various operations, the conduit 60 and the control cable conduit 61 make various movements, and the above configuration prevents or reduces a large force applied to the conduit 60 and the control cable conduit 61 in a bending direction or the longitudinal direction produced due to the various operations by the arm 30.

Further, in this embodiment, the cables CA1 and CA2 for driving the motors 31*a*-36*a* of the robot arm 30 are introduced into the inner space 10*a* of the first base 10 through the inner space 20*a* of the second base 20.

With this configuration, the cables for driving the motors 31*a*-36*a* are introduced into the first base 10 after once inserted through the inner space 20*a* of the second base 20. According to this configuration, it is possible to reduce intrusion of dust into the first base 10, as compared to the case in which the cables CA1 and CA2 for driving the motors 31*a*-36*a* are introduced into the first base 10 from the side of the first base 10.

Moreover, in this embodiment, the robot arm 30 includes: the first swing arm member 32 supported by the rotation arm member 31 so as to be swingable about the horizontal second axis J2; and the second swing arm member 33 supported by the first swing arm member 32 so as to be swingable about the horizontal third axis J3. The wire feeding device 50 configured to feed the welding wire W to the distal end side of the arm 30 is attached to the second swing arm member 33, and an end of the conduit 60 is connected to the wire feeding device 50.

The wire feeding device 50 usually feeds the welding wire W along a longitudinal axis of the second swing arm member 33, and the second swing arm member 33 usually takes a posture extending horizontally, or extending obliquely upward or downward. Therefore, the welding wire W supplied to the wire feeding device 50 also extends along the longitudinal axis of the second swing arm member 33, and the end of the conduit 60 connected to the wire feeding device 50 also extends in a direction along the welding wire W.

Therefore, as a first part of the conduit 60, the conduit extending from the wire feeding device 50 is curved downwardly, as a second part of the conduit 60, the conduit 60 directed substantially downward is pulled into the rotation arm member 31 through the arm member opening 31*b* of the rotation arm member 31, and as a third part of the conduit 60, the conduit 60 within the first base 10 and the second base 20 and a portion of the conduit 60 pulled outside through the side opening 22 of the second base 20 that are curved horizontally. Here, there is a tendency that the smaller the curvature radius of the conduit 60 is, the larger a reactive force against the curve becomes. In other words, in the above situation, if the curvature radius of the third portion of the conduit 60 is small, a force to reduce the curvature can be applied to the first portion of the conduit 60.

According to this embodiment, as a curvature radius of at least one of the conduit 60 within the first base 10, the conduit 60 within the second base 20, and the conduit 60 pulled out through the side opening 22 of the second base 20 can be increased, the force to reduce the curvature applied to the first portion of the conduit 60 can be reduced.

Here, the wire feeding device 50 may be attached to the first swing arm member 32.

According to this embodiment, the inner space 31*c* and the inner space 10*a* are located at the position including the first axis J1. With this configuration, the conduit 60 inserted through the inner space 31*c* and the inner space 10*a* passes in the vicinity of the first axis J1 which is the rotational center of the rotation arm member 31. Therefore, this configuration is advantageous in order to reduce an amount of deformation of the conduit 60 when the rotation arm member 31 rotates.

Here, it is more preferable that the upper opening 21 is located at the position including the first axis J1. This makes it easier for the conduit 60 to pass in the vicinity of the first axis J1 which is the rotational center of the rotation arm member 31.

From the above-described embodiments, the following aspects of the present disclosure are derived.

A robot according to one aspect of the present invention includes: a first base; a robot arm having a rotation arm member supported by the first base, the rotation arm being rotatable about a vertical axis line; and a second base, wherein a bottom end portion of the first base is fixed to an upper end portion of the second base using a fixing member, the rotation arm member includes an arm member opening for introducing a conduit into an interior of the rotation arm member, the second base includes an upper surface having an upper opening and a side surface having a side opening, the rotation arm member and the first base include a hollow portion which allows the conduit introduced into the interior of the rotation arm member through the arm member opening to reach the upper opening, the side opening allows the conduit introduced into an interior of the second base through the upper opening to come out of the second base, and the conduit is configured to contain a welding wire.

According to the above aspect, the bottom end portion of the first base is fixed to the upper end portion of the second base using the fixing member. Therefore, even when the first base is a base for a versatile robot, the rotation arm member may be located at a height of 1 m or higher by fixing the first base to the upper end portion of the second base.

Here, the conduit introduced into the rotation arm member is pulled out through the side opening defined in the second base, in place of the first base. Therefore, it is possible to suppress intrusion of dust into the first base, as compared to the case in which an opening for pulling the conduit out is provided in the first base. As the motor for the rotation arm member and the like are disposed within the first base, it is desirable to prevent dust from entering the first base as much as possible.

Further, the conduit introduced into the rotation arm member and inserted through the hollow portion of the rotation arm member and the first base is pulled out through the side opening of the second base disposed below the first base. Therefore, a curvature radius of the conduit becomes greater, as compared to the case in which the conduit introduced into the rotation arm member is pulled out through the opening defined in the side surface of the first base, and it is possible to prevent the welding wire within the conduit from being bent.

In this aspect, preferably, a cable for driving a motor of the robot arm is introduced into an interior of the first base through the interior of the second base.

According to this aspect, the cables for driving the motors are introduced into the first base after once inserted through the interior of the second base. According to this aspect, it is possible to reduce intrusion of dust into the first base, as compared to a case in which the cables for driving the motors are introduced into the first base from the side of the first base.

In this aspect, preferably, the robot arm includes: a first swing arm member supported by the rotation arm member so as to be swingable about a horizontal axis line; and a second swing arm member supported by the first swing arm member so as to be swingable about a horizontal axis line, a wire feeding device is attached to one of the first swing arm member and the second swing arm member, the wire feeding device is configured to feed the welding wire toward a distal end side of the arm, and an end of the conduit is connected to the wire feeding device.

The wire feeding device usually feeds the welding wire along a longitudinal axis of the second swing arm member, and the second swing arm member usually takes a posture extending horizontally, or extending obliquely upward or downward. Therefore, the welding wire supplied to the wire feeding device also extends along the longitudinal axis of the second swing arm member, and the end of the conduit connected to the wire feeding device also extends in a direction along the welding wire.

Therefore, a portion of the conduit extending from the wire feeding device that is curved downwardly constitutes a first portion of the conduit, a portion of the conduit directed substantially downward that is pulled into the rotation arm member through the arm member opening of the rotation arm member constitutes a second portion of the conduit, and a portion of the conduit within the first base and the second base and a portion of the conduit pulled outside through the side opening of the second base that are curved horizontally constitute a third portion of the conduit. Here, there is a tendency that the smaller the curvature radius of the conduit is, the larger a reactive force against the curve becomes. In other words, in the above situation, if the curvature radius of the third portion of the conduit is small, a force to reduce the curvature can be applied to the first portion of the conduit.

According to this aspect, as a curvature radius of at least one of the conduit within the first base, the conduit within the second base, and the conduit pulled out through the side opening of the second base can be increased, the force to reduce the curvature applied to the first portion of the conduit can be reduced.

In this aspect, preferably, the hollow portion is located at a position including the vertical axis line.
With this configuration, the conduit inserted through the hollow portion passes in the vicinity of the vertical axis line which is the rotational center of the rotation arm member. Therefore, this configuration is advantageous in order to reduce an amount of deformation of the conduit when the rotation arm member rotates.

According to the aforementioned aspects, it is possible to suppress intrusion of dust into a base, as well as to supply a welding wire stably.

The invention claimed is:
1. A robot comprising:
a first base;
a robot arm having a rotation arm member supported by the first base, the rotation arm being rotatable about a vertical axis line; and
a second base, wherein
a bottom end portion of the first base is fixed to an upper end portion of the second base using a fixing member,
the rotation arm member includes an arm member opening for introducing a conduit into an interior of the rotation arm member, through which conduit a welding wire is passed to feed the welding wire to a welding tool attached to the robot arm,
the second base includes an upper surface having an upper opening and a side surface having a side opening,
the rotation arm member and the first base include a hollow portion which allows the conduit introduced into the interior of the rotation arm member through the arm member opening to reach the upper opening,
the side opening allows the conduit introduced into an interior of the second base through the upper opening to come out of the second base, and
the conduit is fixed to the first base by an attachment member in a state in which the conduit is not fixed to the rotation arm member.
2. The robot according to claim 1, wherein
a cable for driving a motor of the robot arm is introduced into an interior of the first base through the interior of the second base.
3. The robot according to claim 1, wherein
the robot arm includes: a first swing arm member supported by the rotation arm member so as to be swingable about a horizontal axis line; and a second swing arm member supported by the first swing arm member so as to be swingable about a horizontal axis line,
a wire feeding device is attached to one of the first swing arm member and the second swing arm member, the wire feeding device is configured to feed the welding wire toward a distal end side of the arm, and
an end of the conduit is connected to the wire feeding device.
4. The robot according to claim 1, wherein
the hollow portion is located at a position including the vertical axis line.
5. A robot comprising:
a first base;
a robot arm having a rotation arm member supported by the first base, the rotation arm being rotatable about a vertical axis line; and
a second base, wherein
a bottom end portion of the first base is fixed to an upper end portion of the second base using a fixing member,
the rotation arm member includes an arm member opening for introducing a conduit into an interior of the rotation arm member, through which conduit a welding wire is passed to feed the welding wire to a welding tool attached to the robot arm,
the second base includes an upper surface having an upper opening and a side surface having a side opening, the rotation arm member and the first base include a hollow portion which allows the conduit introduced into the interior of the rotation arm member through the arm member opening to reach the upper opening, the side opening allows the conduit introduced into an interior of the second base through the upper opening to come out of the second base, and the conduit is fixed to the rotation arm member by an attachment member in a state in which the conduit is not fixed to the first base.

6. The robot according to claim 5, wherein the robot arm includes: a first swing arm member supported by the rotation arm member so as to be swingable about a horizontal axis line; and a second swing arm member supported by the first swing arm member so as to be swingable about a horizontal axis line, a wire feeding device is attached to one of the first swing arm member and the second swing arm member, the wire feeding device is configured to feed the welding wire toward a distal end side of the arm, and an end of the conduit is connected to the wire feeding device.

\* \* \* \* \*